United States Patent [19]

Lichti

[11] Patent Number: 4,559,660
[45] Date of Patent: Dec. 24, 1985

[54] AIRCRAFT LOADING RAMP

[75] Inventor: Robert D. Lichti, Lakewood, Calif.

[73] Assignee: Yusaf Tarkan, Huntington Beach, Calif.

[21] Appl. No.: 551,015

[22] Filed: Nov. 14, 1983

[51] Int. Cl.⁴ ............................................. E01D 1/00
[52] U.S. Cl. .................................................. 14/71.5
[58] Field of Search ............... 14/71.5; 244/137 R, 244/137 P; 74/105

[56] References Cited

U.S. PATENT DOCUMENTS

| | | | |
|---|---|---|---|
| 2,581,293 | 1/1952 | Read et al. | 14/71.5 |
| 2,875,457 | 3/1959 | Read et al. | 14/71.5 |
| 3,060,471 | 10/1962 | Der Yuen et al. | 14/71.5 |
| 3,099,847 | 8/1963 | Lodjic et al. | 14/71.5 |
| 3,123,167 | 3/1964 | Lichti | 180/6.5 |
| 3,184,772 | 5/1965 | Moore et al. | 14/71.5 |
| 3,310,823 | 3/1967 | Preiss | 14/71.5 |
| 3,317,942 | 5/1967 | Wollard et al. | 14/71.5 |
| 3,378,868 | 4/1968 | Wollard et al. | 14/71.5 |
| 3,462,784 | 8/1969 | Seipos | 14/71.5 |
| 3,462,785 | 8/1969 | Seipos | 14/71.5 |
| 3,462,787 | 8/1969 | Seipos | 14/71.5 |
| 3,538,529 | 11/1970 | Breier | 14/71.5 |
| 3,561,030 | 2/1971 | Seipos | 14/71.5 |
| 3,693,204 | 9/1972 | Eggert, Jr. | 14/71.5 |
| 3,699,600 | 10/1972 | Gacs et al. | 14/71.5 |
| 3,728,754 | 4/1973 | Lodjic | 14/71.5 |
| 3,793,662 | 2/1974 | Gacs et al. | 14/71.5 |
| 3,808,626 | 5/1974 | Magil | 14/71.5 |
| 3,859,481 | 1/1975 | Sprague | 191/12 R |
| 3,883,918 | 5/1975 | Magill | 14/71.5 |
| 4,110,859 | 9/1978 | Lichti | 14/71.5 |
| 4,121,345 | 10/1978 | Roesner | 74/105 X |
| 4,161,049 | 7/1979 | Saunders | 14/71.5 |
| 4,318,197 | 3/1982 | Drozd | 14/71.5 |
| 4,318,198 | 3/1982 | Drozd | 14/71.5 |
| 4,333,194 | 6/1982 | Drozd | 14/71.5 |
| 4,333,195 | 6/1982 | Lichti | 14/71.5 |

FOREIGN PATENT DOCUMENTS

790811 7/1968 Canada .................................. 14/70

Primary Examiner—Stephen J. Novosad
Assistant Examiner—Beverly E. Hjorth
Attorney, Agent, or Firm—Fulwider, Patton, Rieber, Lee & Utecht

[57] ABSTRACT

An aircraft loading ramp is disclosed which is capable of movement in three dimensions to accommodate small and large aircraft in varying positions. A tunneled walkway is supported by a pedestal adjacent to the terminal building and a telescoping support column at the free end of the walkway. A cab is rigidly affixed to the telescoping support column for mating with the aircraft. The tunnel is pivotally connected to the cab by a pair of pivotally mounted elongated rocker arms formed at their lower ends with a cam follower which slides along a guide rail affixed to the interior of the telescoping support column to maintain the telescoping support column and the cab upright and to provide a self-leveling mechanism such that the floor of the cab remains level as the telescoping support column is elevated. The tunnel is longitudinally extensible and is adjustable horizontally as the tunnel pivots around the pedestal.

16 Claims, 21 Drawing Figures

FIG.21 a
AIRCRAFT LOADING RAMP

BACKGROUND OF THE INVENTION

1. Field of the Invention

The aircraft loading ramp of the present invention relates generally to adjustable ramps for transferring passengers between a terminal building and an aircraft.

2. Description of the Prior Art

A central problem in the design of loading ramps has been the accommodation of aircraft of varying sizes requiring that the loading ramp be adjustable to accommodate aircraft of different heights. Previous ramp devices attempted to provide a self-leveling mechanism to accommodate the natural tilting of the cab as the tunneled walkway is elevated. Lodgic Canadian Pat. No. 790,811 provides struts pivotally connected to an inner supporting frame and a cab cooperating to provide a parallelogram linkage to maintain the cab level as it is moved. My U.S. Pat. No. 4,110,859 and Sanders U.S. Pat. No. 4,161,049 utilize a parallelogramatic self-leveling mechanism. Such devices are limited in operation because the parallelogramatic linkage will not accommodate a telescoping inner and outer tunnel for horizontal extension of the tunneled walkway since the parallelogramatic operation requires that the distance between the floor and the roof of the tunnel vary as the tunnel is elevated.

SUMMARY OF THE INVENTION

It is a major object of my present invention to provide an aircraft loading ramp with a self-leveling mechanism for the cab. The aircraft loading ramp of the present invention is capable of three-dimensional adjustment, and includes a telescoping, extensible walkway projecting from a terminal building to the aircraft, a cab attached to the free end of the walkway for mating with an aircraft, and a self-leveling mechanism for the cab which varies the angle between the cab and the walkway as the free end of the walkway is raised or lowered. The loading ramp is elevated, in a preferred embodiment, by hydraulic cylinder and plunger means which drives a vertically telescoping support having an upper column slideably fitted over a lower column. To accomodate large aircraft, the hydraulic cylinder and plunger raises the upper column of the support. The walkway is connected to the upper column of the telescoping support and it is therefore raised in conjunction with the upper column. The walkway, the cab, and the telescoping support are interconnected by elongated rocker arm means. The walkway is pivotally connected to the floor of the cab by a horizontal pivot pin which permits the angle between the cab and the walkway to vary as they are raised by the hydraulic cylinder and plunger. The self-leveling mechanism for maintaining the floor of the cab parallel to the ground includes the rocker arm means formed at its lower end with a cam follower that slides along a diagonally disposed guide rail affixed to the support. The upper end of the rocker arm is pivotally connected to the free end of the walkway, and its intermediate portion is pivotally connected to the upper column of the support.

The aircraft loading ramp of the present invention is also provided with friction-reducing rollers between the expandable walkway portions, and adjustable load varying means for the bearings of the pedestal which supports the vestibule of the walkway.

These and other features of the invention will become apparent when taken in consideration with the following detailed description and drawings.

DESCRIPTION OF A PREFERRED EMBODIMENT

Referring to the drawings, and particularly FIGS. 1, 2, 19, 20, and 21, there is shown a preferred form of aircraft loading ramp embodying the present invention. The aircraft loading ramp is utilized for transferring passengers between a terminal building T and the passenger loading hatch (not shown) of an aircraft A. The ramp includes a cab C of conventional construction which mates with the aircraft A and is attached to the free, front end of a walkway tunnel W. The rear end of walkway W extends from a vestibule V which is connected to an opening in the terminal building T. The walkway tunnel W includes an inner walkway, generally designated 30, which is attached at its inner end to vestibule V, and an outer walkway, generally designated 32, fitted over the inner walkway for telescopic extension and retraction. The front end of walkway tunnel W is provided with a vertically extending support S which includes square-shaped upper column means, generally designated 34, and square-shaped lower column means, generally designated 36. The lower column means 36 is telescopically arranged relative to the upper column means. Power-operated elevating means, such as a conventional hydraulic cylinder and plunger unit 38, is interposed between the upper and lower column means for raising and lowering the front end of the walkway tunnel W and cab C relative to the lower column means and the ground. The bottom portion of the lower column means 36 is provided with conventional power-driven, steerable ground-engaging wheels 40.

Figure 1:
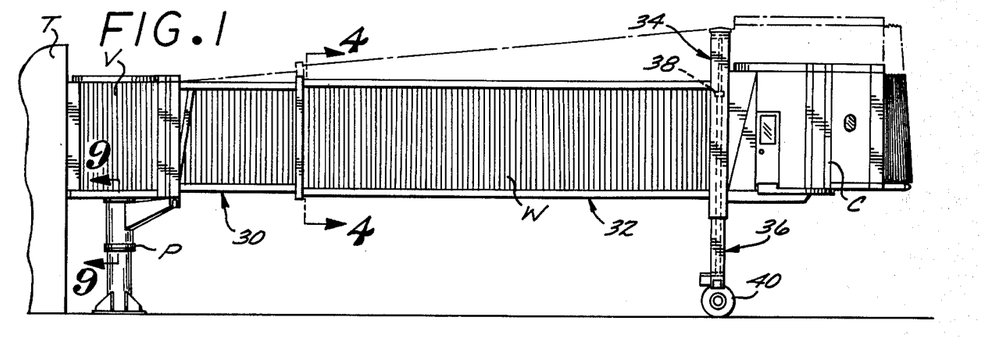
FIG. 1 is a side elevational view of a preferred form of aircraft loading ramp embodying the present invention.
Figure 2:
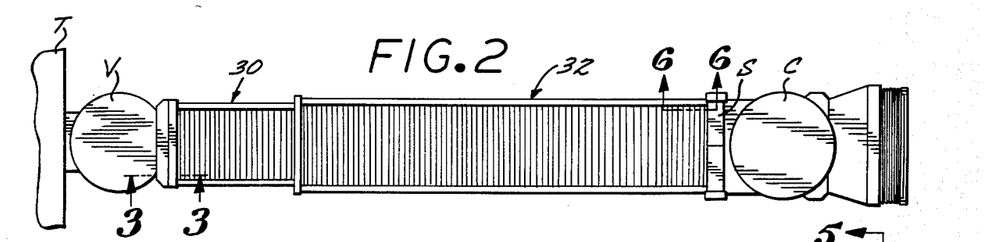
FIG. 2 is a top-plan view of the aircraft loading ramp of FIG. 1.
Figure 20:
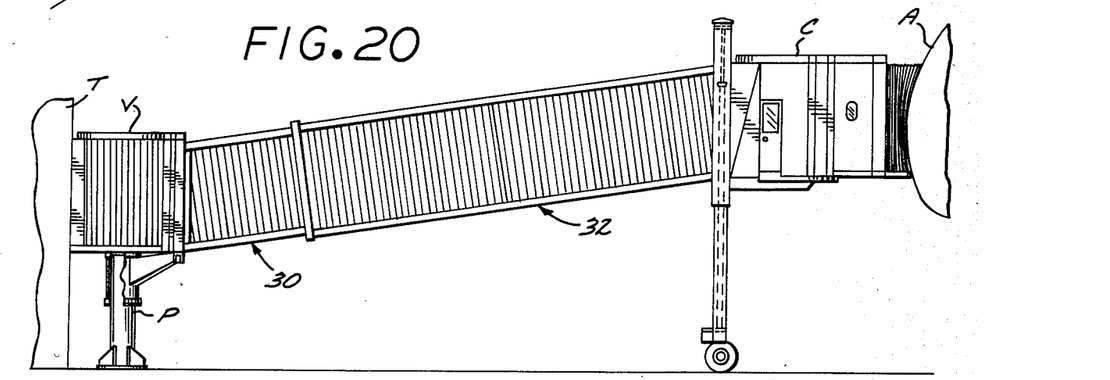
Figure 21:
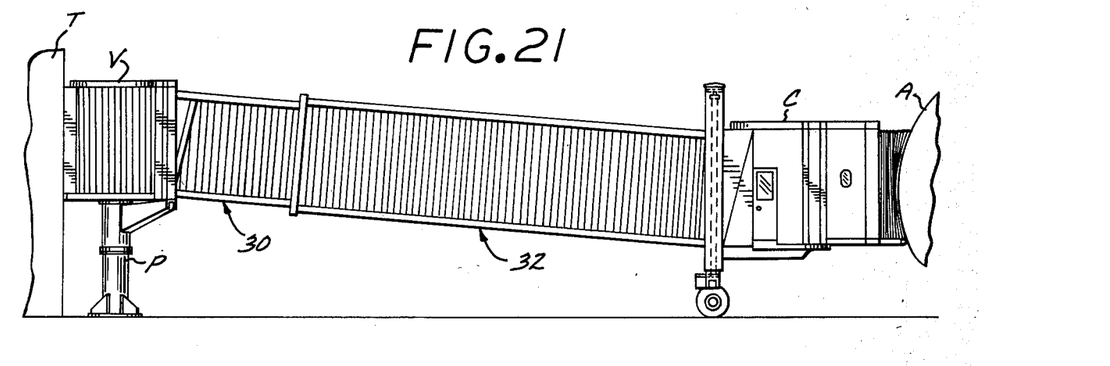

Normally the walkway tunnel W and its cab C will be arranged in their position shown in FIGS. 1 and 2. When an air craft A is to be loaded or unloaded, the walkway tunnel W is extended towards the aircraft under the influence of the power-driven, steerable ground-engaging wheels 40. The walkway and vestibule V are free to swing in a horizontal axis, the vestibule being rotatable relative to building T. Such rotatable attachment is conventional. Referring to FIG. 20, should the height of the aircraft A require that cab C be elevated so as to mate with the aircraft's loading and unloading hatch, the hydraulic cylinder and plunger unit 38 is activated so as to raise the outer column 34 relative to the inner column 36 and thereby elevate the front end of a walkway tunnel W and cab C. If on the other hand the size of the aircraft A requires that the cab C be lowered from its normal position, the hydraulic cylinder and plunger unit will be activated so as to lower the front end of walkway tunnel W and cab C. As indicated in FIGS. 20 and 21, the cab C will be maintained parallel to the ground even though its elevation undergoes considerable change. This feature is provided by the mechanical interconnection of the cab to the front end of outer walkway 32 and support S as described in detail hereinafter.

Figure 3:
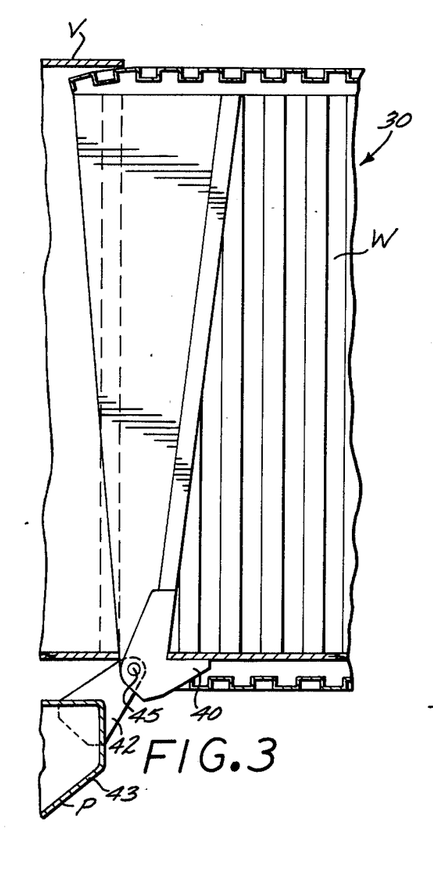
FIG. 3 is a broken vertical sectional view, taken in enlarged scale, along line 3—3 of FIG. 2.
Figure 4:
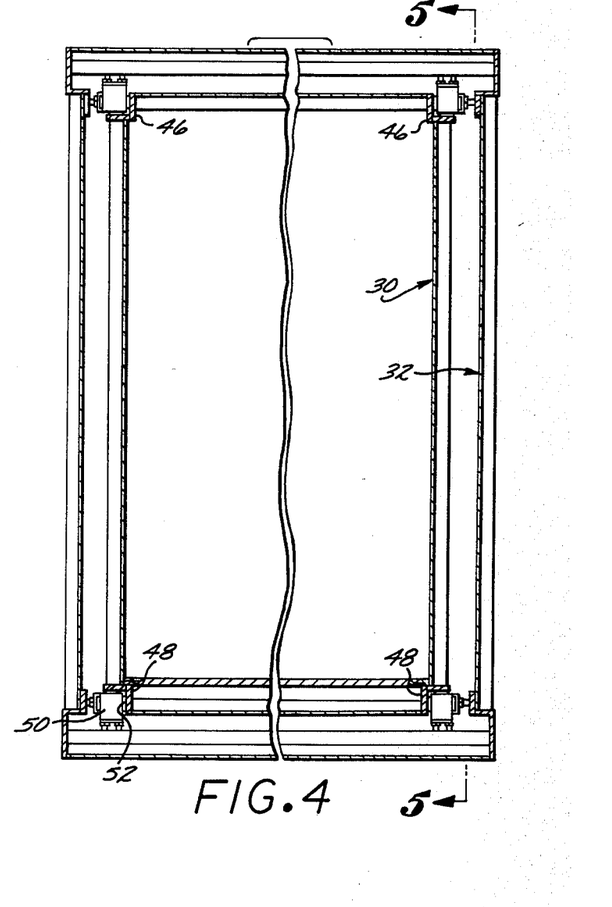
FIG. 4 is a vertical broken sectional view, taken in enlarged scale, along line 4—4 of FIG. 1.
Figure 5:
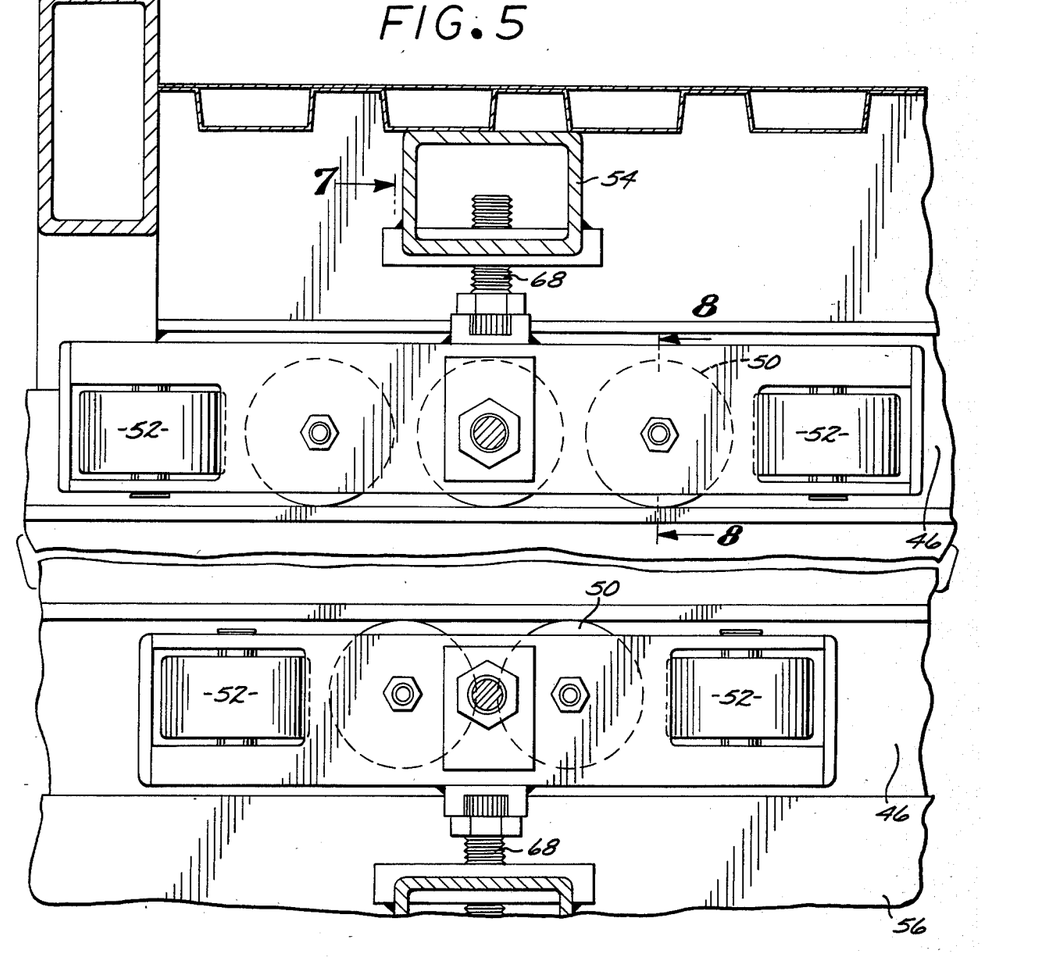
FIG. 5 is a vertically broken sectional view taken along line 5—5 of FIG. 4.
Figure 6:
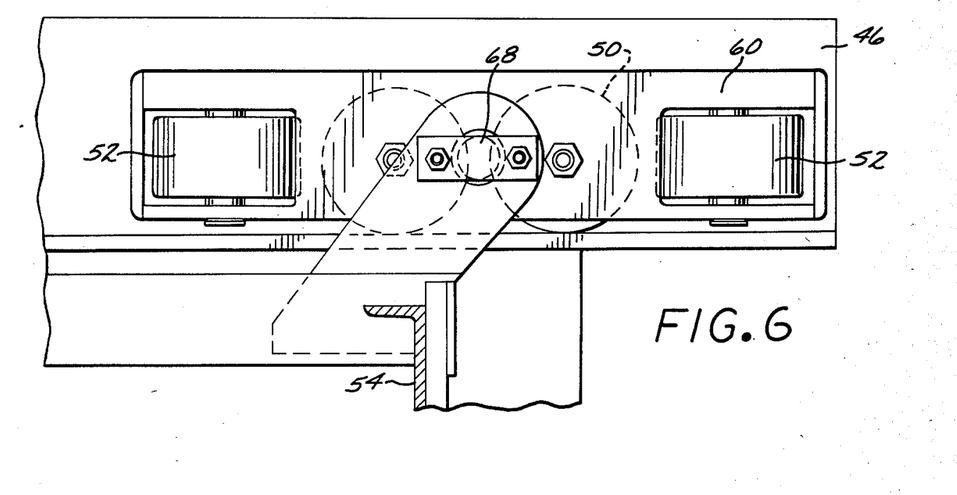
FIG. 6 is a partial vertical sectional view, taken in enlarged scale, along line 6—6 of FIG. 2.
Figure 7:
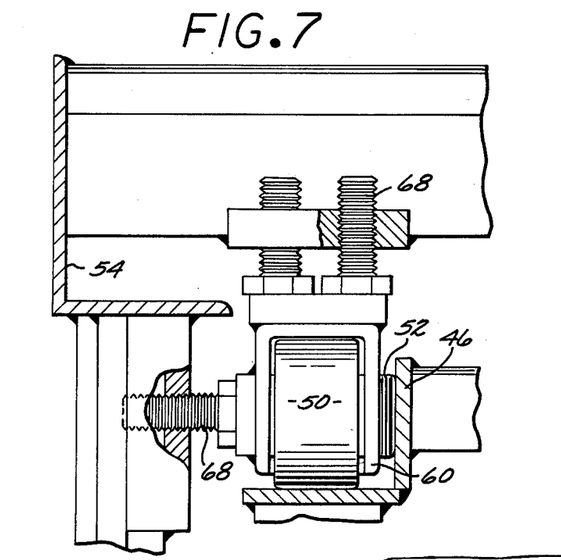
FIG. 7 is a broken vertical sectional view taken from the point designated 7 in FIG. 5.
Figure 8:
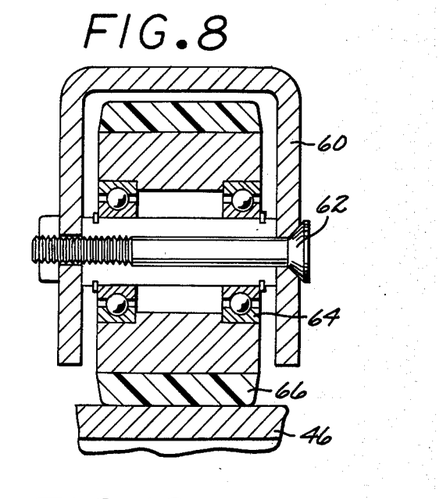
FIG. 8 is a vertical sectional view, taken in enlarged scale, along line 8—8 of FIG. 5.

Referring now additionally to the other drawings for a more particular description of an aircraft loading ramp embodying the present invention, FIG. 3 shows the connection of the inner end of inner walkway tunnel 30 with vestibule V. The lower inner portion of inner walkway 30 is provided with a hinge joint 40 horizontally pivotally connected to a gusset 42 secured to a cross-arm 43 of a ground-engaging of pedestal P by pivot pin 45 as shown in FIG. 3. The vestibule V rotates about a vertical axis as the walkway tunnel W undergoes horizontal swinging movement. In FIG. 4 it will be seen that the upper and lower corner frames 46 and 48 of the inner walkway 34 are generally L-shaped to receive a plurality of vertical rollers 50 and horizontal rollers 52 carried by the adjoining upper and lower corner frames 54 and 56 of the outer walkway tunnel 32. This arrangement is shown in enlarged scale in FIGS. 5-8. It will be observed that the rollers 50 and 52 are supported by housings 60 by means of bolts 62, and are provided with conventional ball bearing assemblies 64. Preferably, the rolles 66 will be made of urethane as indicated particularly in FIG. 8. Housings 60 are connected to frames 54 and 56 by suitable threaded posts 68. It should be understood that the utilization of vertically and horizontally extending rollers reduces the rolling friction between the inner and outer walkways during retraction and extension thereof.

Figure 9:
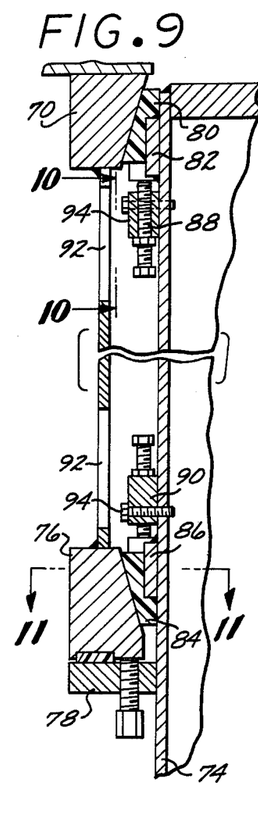
FIG. 9 is a broken vertical sectional view, taken in enlarged scale, along line 9—9 of FIG. 1.
Figure 10:
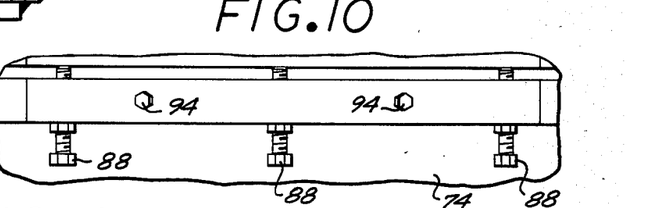
FIG. 10 is a vertical sectional view taken along line 10—10 of FIG. 9.
Figure 11:
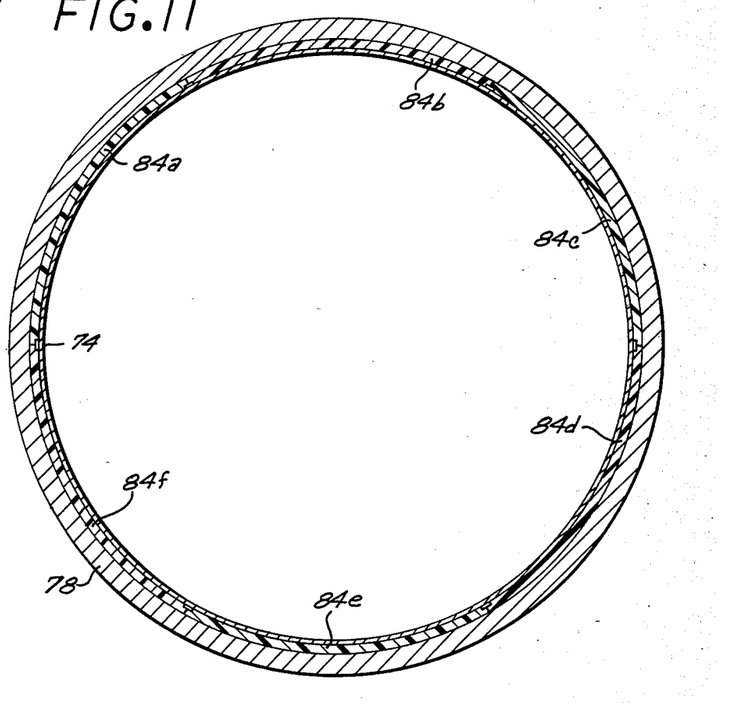
FIG. 11 is a horizontal sectional view taken along line 11—11 of FIG. 1.

Referring to FIGS. 9, 10, and 11, the floor of vestibule V is secured to an upper bearing ring 70, which is in turn affixed to the upper end of outer sleeve 72 of pedestal P. Outer sleeve 72 rotatably depends from the vestibule over lower sleeve 74 of the pedestal. Cross-arms 43 are secured to the outer cylinder 72 in a rigid manner. The lower end of outer sleeve 72 is also affixed to a lower bearing ring 76. A collar 78 is affixed to inner sleeve 74 below lower bearing ring 76. An annular slide bearing 80, which may be fabricated from a suitable synthetic plastic, is interposed between upper bearing ring 70 and lower sleeve 74. Such bearing rests upon an upper annular support 82, which is affixed to lower sleeve 74. A similar lower bearing 84 abuts a lower annular support 86 affixed to the lower sleeve 74. Upper and lower vertically extending adjustment assemblies 88 and 90 are provided for adjusting the load applied to the bearings as such bearings undergo wear. It will be noted that the mating faces of the upper and lower bearing rings and the upper and lower bearings extend diagonally to the vertical.

As indicated in FIG. 11, the upper and lower bearings will preferably be formed of a plurality of segments 84A, 84B, 84C, 84D, and 84F. Additionally, the upper sleeve 72 is formed with openings 92, which permit access to attachment bolts 94 for the adjustment bolt assemblies 88 and 90. With this arrangement, the adjustment bolt assemblies may be removed to permit selective replacement of any worn or damaged segments of the upper and lower bearings.

Referring now to FIGS. 12-18, there is shown a rocker arm cab leveling mechanism M utilized with the aircraft loading ramp of the present invention. Such mechanism includes a pair of rocker arms, generally designated 100, disposed on opposite sides of the front portion of outer walkway 32. The intermediate portion of each rocker arm 100 is pivotally connected to the column 34 of support S between the top and bottom of the outer walkway. The upper end of each rocker arm is pivotally connected to the front portion of outer walkway 32. The lower end of each rocker arm is slideably engaged with an upwardly and forwardly inclined guide rail 102 rigidly affixed to the exterior of inner column 34. A horizontal pivot pin 104 extends through the bifurcations of a bracket 106, such bracket having its rear portion rigidly affixed, as by welding, to the front of outer column 34.

Figure 12:
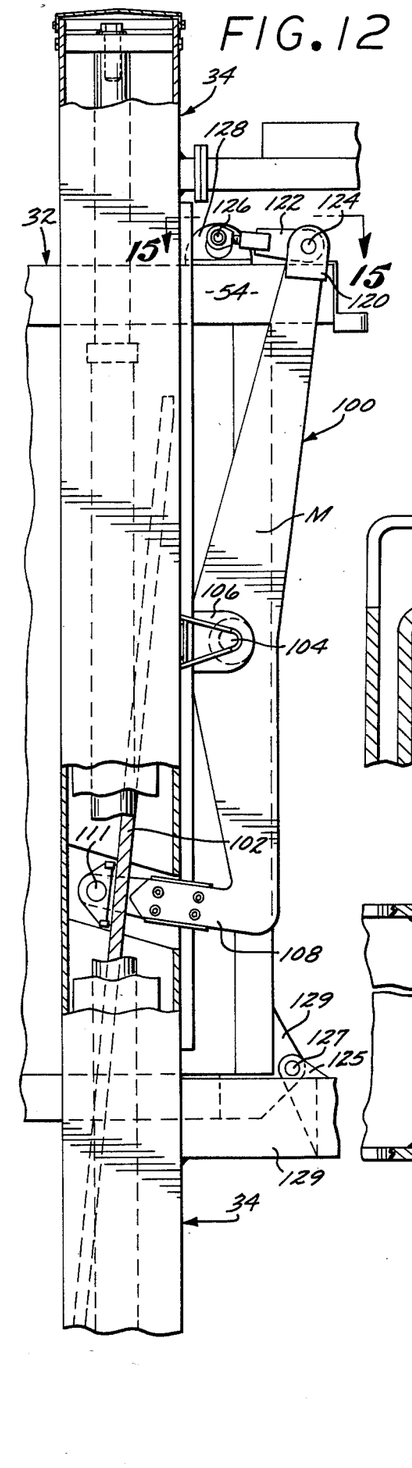
FIG. 12 is a broken side elevational view taken partly in broken vertical section showing the rocker arm leveling mechanism of said aircraft loading ramp.
Figure 13:
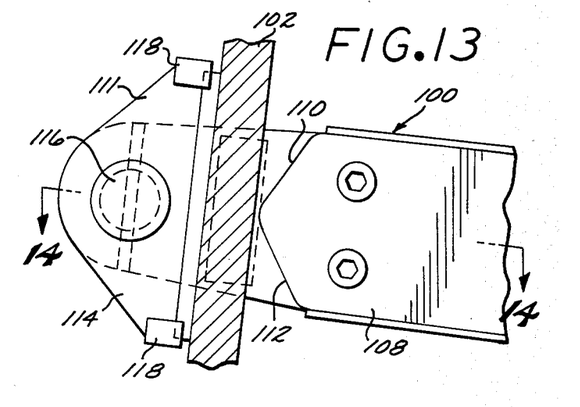
FIG. 13 is an enlarged, fragmentary view of a cam follower member of said rocker arm leveling mechanism.
Figure 14:
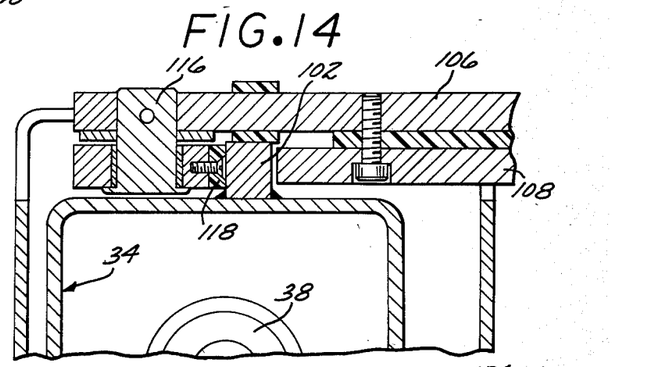
FIG. 14 is a sectional view taken along line 14 of FIG. 13.
Figure 15:
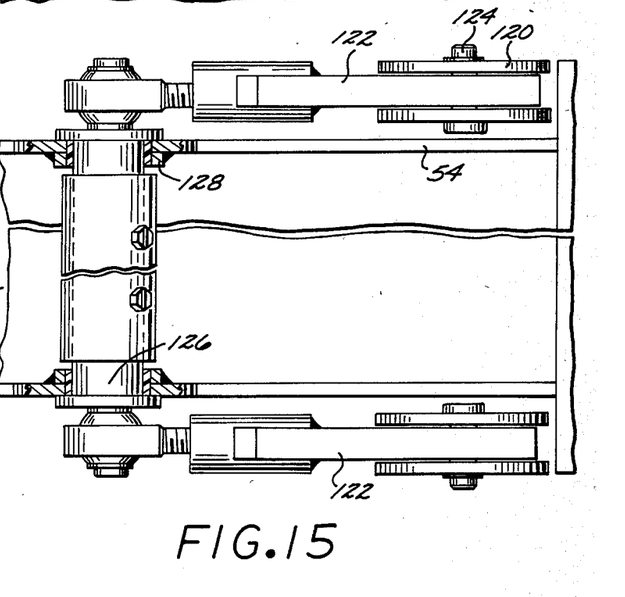
FIG. 15 is a horizontal sectional view, taken in enlarged scale, along line 15—15 of FIG. 12.

The lower portion of each rocker arm includes a rearwardly extending finger 108 having a pointed nose 110 that slideably abuts the front of guide rail 102. A cam follower 111 extends rearwardly from the exterior of leg 108 and defines a channel 112, which slideably encompasses guide rail 102. A slider 114 is pivotally attached to the rear end of cam follower 111 by a pivot pin 116. Anti-friction pads 118 secured to the front portion of slider 114 slideably engage the rear surface of guide rail 102. The upper end of rocker arm 100 is provided with a bifurcated bracket 120 which pivotally receives the front end of a rearwardly extending link 122 by means of a horizontal pivot pin 124. The rear end of link 122 is rigidly attached to one end of a horizontal torsion bar 126. Torsion bar 126 extends between a pair of upstanding ears 128, having their lower portion rigidly affixed to the front ends of upper corner frames 54 of outer walkway 32. It is important to note that the floor 129 of cab C is rigidly affixed, as by welding, to the front of outer column 34 below the front of outer walkway 32. Floor 129 intersects outer support 32 at right angles and is hence parallel to the ground. Also, as indicated in FIG. 12, it will be noted cab floor 129 is provided with a bracket 125 that receives a horizontal pivot pin 127 which extends through a bracket 129 formed on the lower front end of outer walkway 32.

Figure 16:
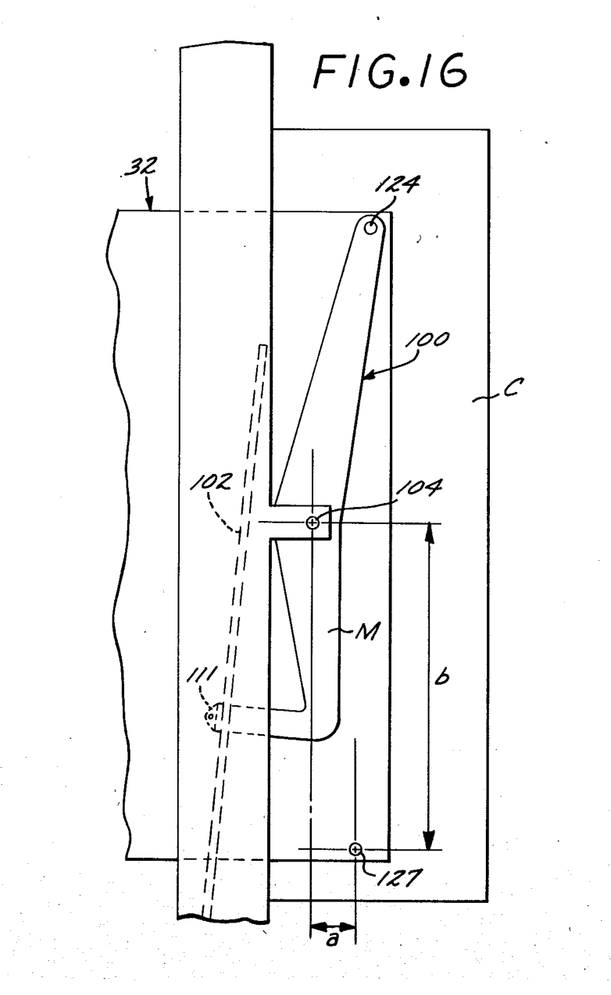
FIGS. 16, 17, and 18 are diagramatic views showing the operation of the rocker arm leveling mechanism of the present invention.
Figure 17:
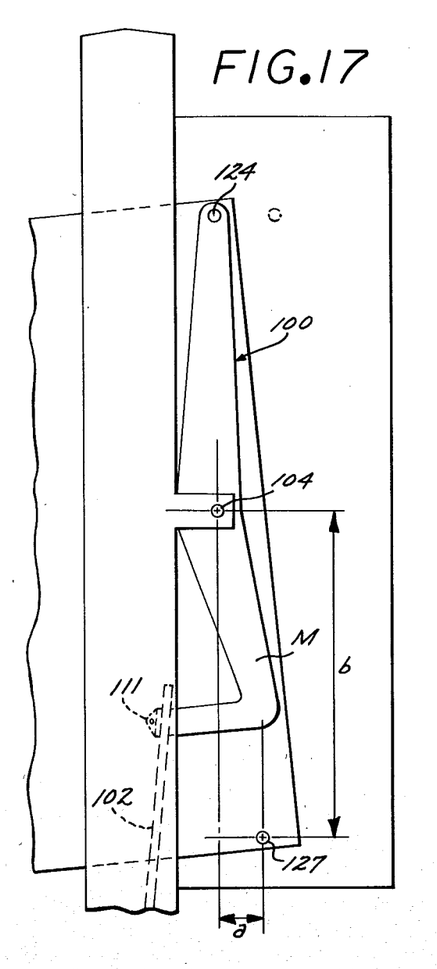
Figure 18:
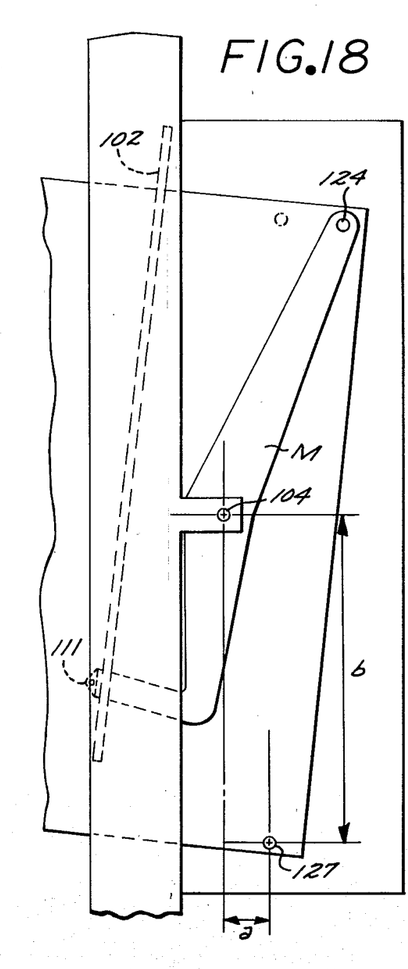
Figure 19:
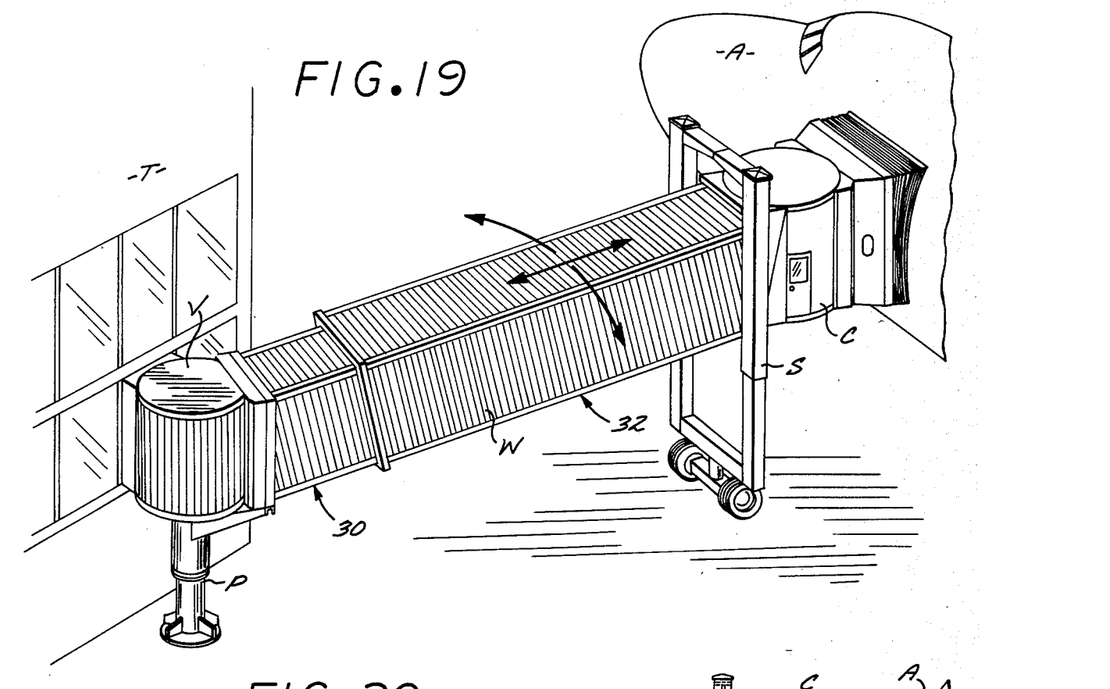
FIGS. 19, 20, and 21 are views showing the mode of operation of the preferred form of aircraft loading ramp embodying the present invention.

The operation of the aforedescribed rocker arm leveling mechanism M is particularly shown in FIGS. 16, 17, and 18. Referring thereto, each rocker arm 100 is shown in its normal position corresponding to the position of the parts of the aircraft loading ramp in FIGS. 1 and 2. At this time, cab C is level relative to the ground, and the front end of outer walkway 32 extends into the intermediate portion of such cab. FIG. 17 represents the position of the rocker arm leveling mechanism when the parts of the aircraft loading ramp are in their position of FIG. 20, i.e., when the front end of outer walkway 32 and cab C have been raised. It will be observed that as the front end of the outer walkway 32 and the cab C move upwardly, rocker arm 100 will have pivoted in a counterclockwise direction relative to its original position of FIG. 16, since the lower end of the rocker arm will have slid upwardly along guide rail 102. Such rocker arm movement permits the front portion of outer walkway 32 to tilt and concurrently the upper end thereof retracts from its original position within cab C. However, since the cab is fixed relative to the upper support column 34, such cab will remain level as it moves upwardly with the upper support column.

Referring now to FIG. 18, the parts of the leveling mechanism are disposed in a position corresponding to the position of the parts of the aircraft loading ramp shown in FIG. 21, i.e., the cab C and the outer walkway will have been lowered relative to their original position. It will be observed that rocker arm 100 has pivoted counterclockwise relative to its positions of FIGS. 16 and 17, with the upper front end of outer walkway 32 moving further into the confines of cab C. The clockwise rotation of the rocker arms takes place as the lower end thereof slides downwardly along guide rail 102. Again, since the cab C is rigidly affixed to the upper support column 34, it will remain level during its downward movement. The pivotal attachment of the front end of outer walkway 32 and cab floor 129 provides a firm attachment of these two members at all times. The distances a and b between hinge pins 104 and 127 remain constant.

It will be apparent that since cab C is maintained level regardless of the elevation of the front of walkway tunnel W and cab C, passenger ingress and egress will be facilitated.

Various modifications and changes may be made with respect to the foregoing detailed description without departing from the spirit of the present invention.

I claim:

1. An aircraft loading ramp for transferring passengers between a terminal building and an aircraft comprising:
    a cab for mating with an aircraft and disposed in a substantially horizontal orientation;
    a walkway tunnel projecting from the terminal building and terminating in a free front end remote from said building, the front end of said walkway being movable upwardly and downwardly resulting in said front end passing through a predetermined arc;
    a pivotal connection interposed between the lower portion of said cab and the front of said walkway tunnel whereby the vertical angle between said cab and said walkway tunnel may vary;
    a generally vertical support for the front end of said walkway tunnel including vertically extending upper and lower column means that are relatively vertically slidable;
    gound-engaging wheel means on the bottom portion of said lower column means;
    a rigid attachment between said cab and the upper column means of said support;
    power-operated elevating means for raising and lowering said upper column means of said support relative to said lower column means and the ground;
    an upwardly and forwardly extending guide rail secured to said lower column means; and
    an elongated rigid rocker arm formed with upper and lower portions;
    pivot mount means mounting said rocker arm centrally from said upper column means;
    a pivot pin connecting said upper portion of said rocker arm to the upper portion of said walkway tunnnel;
    a follower engaging said lower portion of said rocker arm with said guide rail; and
    said rocker arm, guide rail, pivot mount, pivot pin and follower being so configured and arranged in spaced relationship as to cause said rocker arm to be raised and lowered with said upper column means to thereby cause said upper arm portion to cooperate with said pivotal connection in raising and lowering said front end of said walkway, while causing said follower to travel along said guide rail to cooperate with said pivot pin to maintain the magnitude of horizontal travel of said pivot mount means substantially equal to that of said pivotal connection to thereby maintain said support generally vertical and said cab in said substantially horizontal orientation irrespective of the inclination of said walkway.

2. An aircraft loading ramp in accordance with claim 1 wherein said walkway tunnel includes a vestibule attached to the terminal building, an inner walkway fixed at its inner end to said vestibule, and an outer walkway fitted over the inner walkway for telescopic extension and retraction.

3. An aircraft loading ramp in accordance with claim 2 wherein said vestibule is supported by a pedestal member that includes a coaxial fixed ground-engaging lower sleeve and an upper sleeve that depends rotatably from the vestibule over the upper portion of the lower sleeve.

4. An aircraft loading ramp in accordance with claim 3 wherein upper and lower bearings are interposed between said upper and lower sleeves, and with vertical adjustment bolts assemblies being provided to vary the loading of said bearings as said bearings undergo wear.

5. An aircraft loading ramp in accordance with claim 2 wherein roller bearing means are interposed between said walkways, said roller bearing means comprising a plurality of vertically and horizontally extending rollers which engage vertical and horizontal surfaces formed on said inner and outer walkways.

6. An aircraft loading ramp in accordance with claim 5 wherein said vestibule is supported by a pedestal that includes a fixed ground-engaging lower sleeve and an upper sleeve that rotatably depends from the vestibule over the upper portion of the lower sleeve.

7. An aircraft loading ramp in accordance with claim 6 wherein top and bottom bearings are interposed between said sleeves, and with adjustment bolt assemblies being provided to vary the loading of said bearings.

8. An aircraft loading ramp in accordance with claim 7 wherein said rocker arm means has its intermediate portion connected to said upper column means, its upper end pivotally secured to the front portion of said outer walkway and its lower portion slideably engaged with said guide rail.

9. An aircraft loading ramp in accordance with claim 6 wherein said rocker arm means has its intermediate portion connected to said upper column means, its upper end pivotally secured to the front portion of said outer walkway and its lower portion slideably engaged with said guide rail.

10. An aircraft loading ramp in accordance with claim 2 wherein said upper column means is telescopically positioned over said inner column means, and said elevating means includes hydraulic cylinder and piston means interposed between said inner and outer column means.

11. An aircraft loading ramp in accordance with claim 2 wherein said rocker arm means has its intermediate portion connected to said upper column means, its upper end pivotally secured to the front portion of said outer walkway and its lower portion slideably engaged with said guide rail.

12. An aircraft loading ramp in accordance with claim 1 wherein said upper column means is telescopically positioned over said inner column means, and said elevating means includes hydraulic cylinder and piston means interposed between said inner and outer column means.

13. An aircraft loading ramp in accordance with claim 12 wherein said rocker arm means has its intermediate portion connected to said upper column means, its upper end pivotally secured to the front portion of said walkway tunnel and its lower portion slideably engaged with said guide rail.

14. An aircraft loading ramp in accordance with claim 1 wherein the upper end of said rocker arm means includes a pair of rocker arms, each having its upper end pivotally connected to the upper front portion of said walkway tunnel by means of a link that is pivotally connected at its front end to one of said rocker arms and extends towards the walkway where it is affixed to the end of a horizontally extending torsion bar extending across the walkway tunnel.

15. An aircraft loading ramp in accordance with claim 1 wherein said vestibule is supported by a pedestal member that includes a coaxial fixed ground-engaging lower sleeve and an upper sleeve that depends rotatably from the vestibule over the upper portion of the lower sleeve.

16. An aircraft loading ramp apparatus for transferring passengers and cargo between a terminal and an aircraft located in a loading area:
 a vertical column located adjacent said loading area and including an upper column portion elevatable relative to the lower column portion;
 an elevatable walkway for projecting from the terminal to terminate in a front end disposed adjacent said vertical column, said front end being elevatable through a predetermined arc;
 means for connecting said walkway with said terminal to allow for raising and lowering of said front end;
 a cab rigidly mounted from said column and disposed in a substantially horizontal orientation;
 means on said column for raisiing and lowering of said column;
 first horizontal pivot means coupling said front end of said walkway with said cab;
 an elongated rocker rigid arm extending in a generally vertical direction and formed with upper and lower extremities;
 second pivot means mounting the medial portion of said rocker arm from said upper column portion;
 third pivot means pivotally connecting said upper extremity of said rocker arm with the upper portion of said front of said walkway;
 upwardly and forwardly extending guide means on the lower portion of said column;
 a follower mounted on said lower extremity and engaged in sliding relationship with said guide means; and
 said rocker arm, first, second and third pivot means and guide means being configured and arranged for sliding of said follower along said guide means as said upper column is raised and lowered to cooperate together in maintaining said column substantially vertical irrespective of the vertical positioning of said front of said walkway.

* * * * *